United States Patent
Kraus et al.

(10) Patent No.: US 7,136,059 B2
(45) Date of Patent: Nov. 14, 2006

(54) METHOD AND SYSTEM FOR IMPROVING SITUATIONAL AWARENESS OF COMMAND AND CONTROL UNITS

(75) Inventors: Jehoshua Kraus, Haifa (IL); Gilad Adiv, Bikat Beit Hakarem (IL); Yigal Sroka, Haifa (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 540 days.

(21) Appl. No.: 10/152,837

(22) Filed: May 23, 2002

(65) Prior Publication Data

US 2002/0196248 A1 Dec. 26, 2002

(30) Foreign Application Priority Data

May 23, 2001 (IL) .................................... 143414

(51) Int. Cl.
*G06T 17/00* (2006.01)

(52) U.S. Cl. ...................................................... 345/419
(58) Field of Classification Search ................ 345/419
See application file for complete search history.

(56) References Cited

U.S. PATENT DOCUMENTS

| | | |
|---|---|---|
| 4,682,160 A | 7/1987 | Beckwith, Jr. et al. |
| 5,936,553 A | 8/1999 | Kabel |
| 6,119,976 A | 9/2000 | Rogers |
| 6,160,497 A | 12/2000 | Clark |
| 6,208,933 B1 | 3/2001 | Lazar |
| 6,278,396 B1 | 8/2001 | Tran |
| 6,469,660 B1 | 10/2002 | Horvath et al. |
| 6,512,975 B1 | 1/2003 | Watson |
| 6,567,043 B1 | 5/2003 | Smith |

FOREIGN PATENT DOCUMENTS

| | | |
|---|---|---|
| EP | 1091190 | 4/2001 |
| IL | 111069 | 9/1994 |

OTHER PUBLICATIONS

"Automated Geo–Spatial Images And Data Exploitation" Proceedings of SPIE vol. 4054, Apr. 24, 2000.

Ellingson: "Joint Tactical Information Distribution System (JTIDS)" National Telecommunciations Conference. New Orleans, Dec. 1–3, 1975, New York IEEE vol. 1, Conf Dec. 1975 pp 1410–1414.

Stiglitz; "The Joint Tactical Information Distribution System " Microwave Journal Oct. 1987, USA vol. 30, #10 pp 26–41.

Toone; Introduction to JTIDS (Joint Tactical Information Distribution System) signal Aug. 1987 vol. 41, No. 12 pp 55–59.

*Primary Examiner*—Almis R. Jankus
(74) *Attorney, Agent, or Firm*—Mark M. Friedman

(57) ABSTRACT

A method for sharing visual situational information of objects among a number of command and control units. The method includes the steps of providing to each command and control unit a mechanism for storing a digital reference map of a geographical area, receiving by one or more command and control unit an image of a scene which includes one or more object within the geographical area, registration of the received image of the scene to the digital reference map, updating a situational information of the object in the reference map, and transferring the updating of the situational information to one or more other command and control unit.

27 Claims, 2 Drawing Sheets

METHOD AND SYSTEM FOR IMPROVING SITUATIONAL AWARENESS OF COMMAND AND CONTROL UNITS

BACKGROUND OF THE INVENTION

The present invention relates generally to communication between command and control (C&C) units, more particularly to digital data exchange over a data link between C&C units, of visual data acquired by airborne vehicles, which are controlled by the C&C units.

The present invention also relates to Israeli Patent No. 111069 to Sroka et al. incorporated by reference for all purposes as if fully set forth herein.

As will become apparent upon reading the detailed description of the present invention, the present invention relies on topics of digital mapping, image registration and visual display of data link communication, all of which are prior art, partly described in the following patents:

U.S. Pat. No. 6,160,497 to Clark describes a display and methodology for visually rendering digital data link communications between aircraft and other aircraft or ground units.

The display may reside in the aircraft cockpit visually displaying the digital data link communications. The display may also be used at a ground location, such as at an air traffic control unit. Visually displaying the digital data link communications allows a pilot to obtain situational awareness by monitoring the digital communications between aircraft, and may be used in combination with or replace monitoring the voice communications being exchanged over the voice channels.

U.S. Pat. No. 4,682,160 to Beckwith, Jr., et al. describes a system for generating a real time perspective view of the terrain lying along an aircraft's flight path, accessing terrain data stored in a digital map generator and converting the data into a perspective representation of the terrain on the face of a suitable display such as a cockpit instrument panel CRT.

U.S. Pat. No. 5,936,553 to Kabel describes a navigation device and method for displaying navigation information in a visual perspective view.

U.S. Pat. No. 6,119,976 to Rogers describes a shoulder launched unmanned reconnaissance system for providing overhead visual surveillance of remote targets. That invention includes a reconnaissance air vehicle, which may be launched from a portable launcher.

The aforementioned Israeli Patent No. 111069 to Sroka, et al. describes a method and system for marking object images acquired at high zooming by an airborne imaging device, on a reference map having a wide field of view of the scene.

None of the prior art references addresses a situation wherein a visual status of an object whose image is acquired by one C&C unit is automatically updated in real time in all the C&C units which are connected to this C&C unit.

Such updated information will be useful in keeping the situational awareness of the operators of the informed C&C units and will be helpful to them in reassigning new objects for airborne vehicles under their control.

As an example, consider a fleet of aircraft carriers wherein each ship controls its own squadron of aircraft. Each aircraft carrier is thus an autonomous command and control unit with respect to its aircraft. Besides, assume that some of the ships supervise collectively the same geographical terrain territory, thus they use maps or aerial photographs in which the same targets may appear.

Assume also that whenever an aircraft under the C&C of one of the ships engages a specific target, the aircraft also transmits back to its ship (only) images of scenes, which includes the engaged target.

In such a case it should be beneficial that the rest of the aircraft carriers should be aware of the change of the status of the engaged target and thus avoid sending (or alternatively distracting, if they are already in air) their aircraft from this specific target.

In the past, operators of the individual control units were able upon listening to verbal communication to mark by hand or electronically, (e.g. by using a mouse) objects on maps or aerial photographs.

With the advent of "speechless" digital data link communications between control units, the operator of a control unit no longer receives the necessary information permitting him to be aware of changes in status of objects which are reported by other control units. Furthermore even if he has been exposed to this vast quantity of verbal information, he would not be able to handle it.

The present invention fills this gap and provides other related advantages.

SUMMARY OF THE INVENTION

The present invention includes a system and method for sharing, between a plurality of interconnected command and control units, visually rendered situational information in regard to objects under surveillance of an airborne vehicle, wherein this information is transferred in real time by a digital data-link communication According to the present invention there is provided a method for sharing visual situational information of objects among command and control units comprising the steps of: (a) providing to each command d and control unit a mechanism for storing a digital reference map of a geographical area; (b) receiving by at least one command and control unit an image of a scene which includes at least one object located within the geographical area; (c) registration of the received image of the scene to the digital reference map of the at least one command and control unit; (d) updating a situational information of the at least one object in the digital reference map of the at least one command control unit according to the received image of the scene and, (e) transferring the updating of the situational information of the at least one object to at least one other command and control unit among the plurality of command and control units.

According to the present invention there is provided a system for improving the situational awareness of a plurality of command and control unit, the system comprising: (a) a plurality of command and control units, in each command and control unit; a database located in an addressable memory of the each of command and control units, each the database storing a digital reference map of a geographical area which includes a location of at least one object under a surveillance of at least one command and control unit; (b) a mechanism for updating a situational information of the at least one object in the digital reference map stored in the at least one command and control unit in accordance to a received image of a scene which includes the at least one object, and (c) a communication mechanism between the at least one command and control unit and at least one other command and control unit.

Other objects and goals of the present invention will become apparent upon reading the following description in conjunction with the following figures.

BRIEF DESCRIPTION OF THE DRAWINGS

The invention is herein described, by way of example only, with reference to the accompanying drawings, wherein.

DETAILED DESCRIPTION OF THE EMBODIMENTS

The present embodiments herein are not intended to be exhaustive and to limit in any way the scope of the invention, rather they are used as examples for the clarification of the invention and for enabling of other skilled in the art to utilize its teaching.

The purpose of the present invention is to update automatically and in real time digitally data regarding the status of an object stored by a plurality of interconnected C&C units, in accordance to an information about a situational change of the object as perceived from an image of the object which was acquired by a remote sensor controlled by one of the C&C units.

Figure 1:
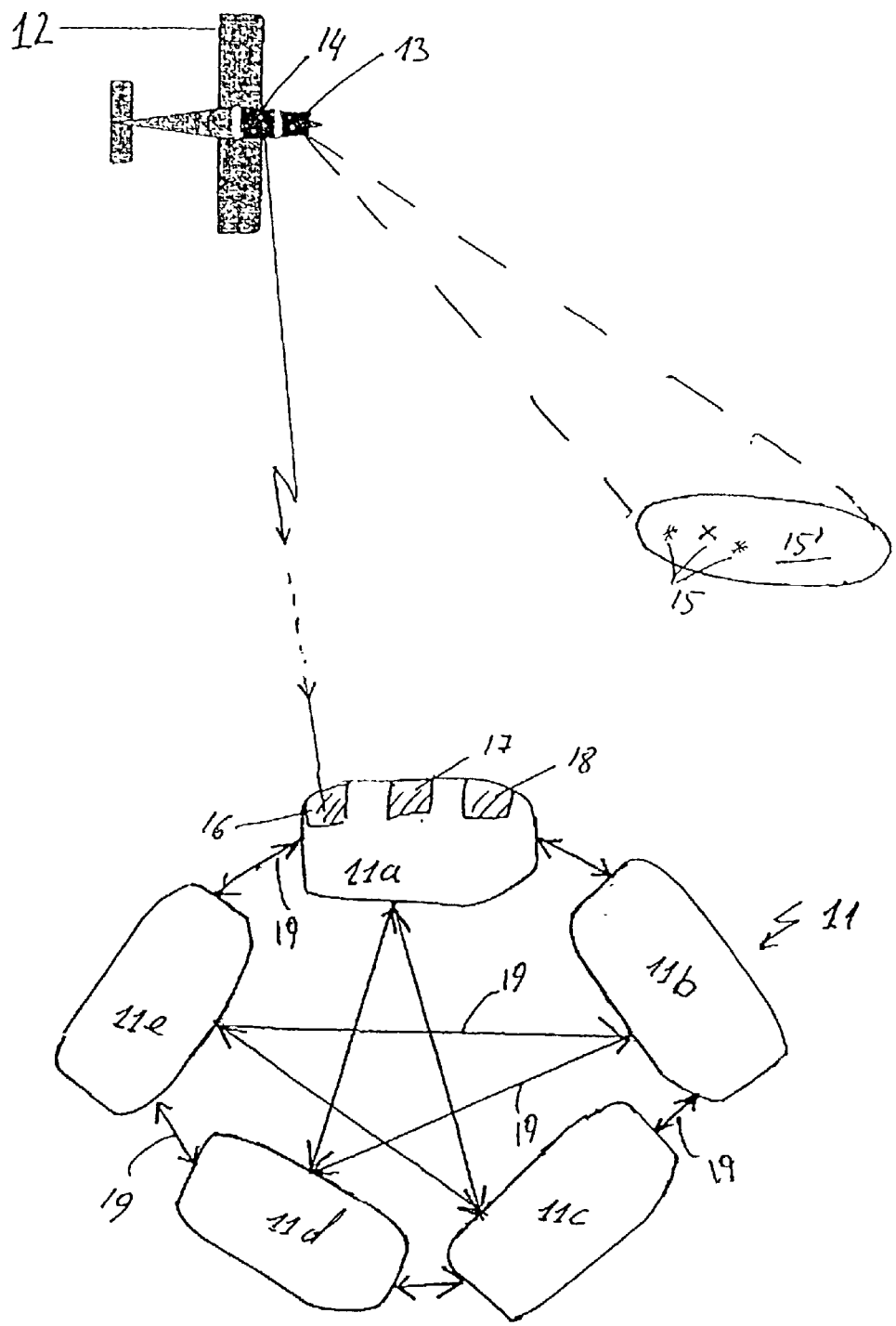
FIG. 1 shows elements in a command and control system according to the present invention and, FIG. 2 shows operational interrelations between elements of a command and control unit according to the present invention.

A non limiting example demonstrating the scope of the present invention is shown in FIG. 1 to which reference is now made.

FIG. 1 shows a group 11 of 5 C&C units, 11a to 11e, interconnected to each other in such a way as to enable two-way digital data links 19 between each member of the group and the rest of the members of the group. The interconnection can be carried out by any networking known in the art (e.g. using physical wiring as electrical conductors, optical fibers, or via wireless communication).

Each C&C unit in group 11 is in charge for the surveillance of a certain geographical area (not shown), by the observation or the engagement of targets in that area, preferably by remote command and control of airborne vehicles flying over that area, such as e.g. an unmanned low altitude remotely piloted vehicle 12 which is controlled by unit 11a of group 11.

Airborne vehicle 12 carries onboard a imaging device 13 to acquire images of scene 15' which is located in the geographical area which is under the surveillance of C&C unit 11a and which includes objects 15.

Airborne vehicle 12 carries on board a transmitting device 14. which transmits wirelessly or via an optical fiber (not shown) an image of scene 15'. which was acquired by imaging device 13, to an image receiving device 16 located in C&C unit 11a. Image receiving device 16 reconstructs a digital image of scene 15' which include objects 15 in an addressable memory location of a computer (shown in FIG. 2. where C&C unit 11a is depicted in greater detail) of C&C unit 11a. Besides received digital image of object 15 is visually displayed on at least one of displays 17, 18 located in C&C unit 11a.

Each C&C unit of group 11 stores in the database of its computer a digital image of the area, which that unit supervises; the aerial digital image includes images of objects (e.g. objects 15) that can be affected by means that are controlled by that C&C unit.

More generally and yet included within the scope of the present invention is a situation in which imaging device 13 is not on board of a flying vehicle, rather it is positioned "on the ground", in such a way however, as to enable its surveillance on the neighboring scenery. E.g. imaging device 13 is positioned on a topographically elevated place like a hill, which looks over its underlying valley, or is posted on a high mast (either stationary or mobile). Hence the term "airborne" is broadened in context with the present invention to include these situations.

The database digital image of the area, which will be referred hereinafter as the "digital reference map", is based on aerial photography (either conventional or orthogonal photography), whose output was digitized by known techniques. The digital reference map is constantly displayed on a suitable display device as display 18 in C&C unit 11a.

Although both maps and aerial photos present a "bird's-eye" view of the earth, aerial photographs are not maps. Maps are orthogonal representations of the earth's surface, meaning that they are directionally and geometrically accurate (at least within the limitations imposed by projecting a 3-dimensional object onto 2 dimensions). Aerial photos, on the other hand, display a high degree of radial distortion. That is, the topography is distorted, and until corrections are made for the distortion, measurements made from a photograph are not accurate.

An orthogonal photograph is a result of processing of two aerial photographs taken with two cameras having their axis at the time of exposure pointing down at different angles to the normal to ground, and which like a map, it is to scale.

Accordingly, the geographical location of each point in the digital reference map is known because its position vector with respect to visual features of reference landmarks on the digital reference map can be determined accurately, wherein the exact geographical coordinates of the landmarks were determined by known surveying techniques.

It should be noticed with regard to the present invention that in spite the fact that reference digital maps of individual C&C units do not have to be identical, or to overlap completely they should however include a common region e.g. such as area 15' which contains objects 15.

The coordinates (pixels) of an object 15 can be assigned in the digital reference map of C&C unit 11a (hence its exact geographical location can be determined too) according to the object's appearance in an image of scene 15', acquired by imaging device 13 on board of airborne vehicle 12

Such an image, which is included in at least one video frame or at least one still picture, is transmitted by airborne vehicle 12 in real time to the C&C unit 11a, which controls the respective airborne vehicle 12.

While the reference digital map, either in a format of a map or in a format of an orthogonal photograph is a two dimensional projection of a scenery, the appearance of object 15 in scenery 15' acquired by imaging device 13 of airborne vehicle 12, usually corresponds to a perspective view of the scene.

Self-navigation of airborne vehicles using their ability to orient themselves according to the perspective view of recognizable objects in their route is prior art. This orientation is based on the establishment of correspondence between two or more images which is known in the art as image registration, see e.g. "*Automatic Geo-Spatial Images and Data Exploitation*", Proceedings of SPIE, Vol. 4054, Apr. 24, 2000.

One desired output of the image registration process is a useful representation of the correspondence between overlapping sets of images; usually a mapping function which in the present invention, transforms the spatial coordinates set of the perspective view image into the corresponding spatial coordinates set of the reference digital map.

Thus; the pixels in the digital reference map, which belong to the location of the object whose perspective view is being received, can be identified and manipulated.

Relating pixels of an image of an object which is included in a wide field of view of a reference image to the pixels of the image of the object in a zoomed field of view was also described in the aforementioned Israeli Patent No. IL 111069.

It should be noted that according to the present invention, the physical nature of images provided by the airborne imaging device might be different that the physical nature underlying the image in the digital reference map.

Thus for example, while the digital reference map is usually based on a visible optical imagery of the area under surveillance, the images of objects acquired by the airborne vehicles may include infrared images, thermal images, multi-spectral images, ladar (laser radar) images, radar images and images which are based on the output of chemical and biological sensors.

After image registration, an operator of the C&C unit 11a electronically updates the digital reference map of his C&C unit so as to take into account the observed changes in the situational information of the objects.

A change in the situational information of an object is a change in the object's geographical location or a change in the object's physical or chemical state; (e.g. a vehicle has been removed, a target has appeared or alternatively was destroyed, or a residential area was affected by chemical warfare).

The decision of as to which are the objects whose their situational information should be updated in the digital reference map is usually submitted to the operator's discretion according to his mental awareness of the situation; however an automatic decision making system, which decides what object deserves updating is included within the scope of the present invention.

By the term "electronic updating" it is meant to any indication with regard to the pixel map of the object in the digital reference map that differentiates the object's symbolization in the digital reference map after the updating, as compared to its symbolization before the updating. E.g. in the digital reference map; marking the image of the object or its location, changing the object's image size, color, contrast and even the total elimination of the object image from the reference digital map.

Such an electronic updating which is practically carried out by manipulating the image of the object or its location in the visual display of the digital reference map, can be coded and has to have a common meaning to the operators of all C&C units.

The updated digital reference map is then either stored in the database of C&C unit 11a as a second layer on top of the original digital reference map, or replaces the original digital reference map in the database of C&C unit 11a The present invention also includes an automatic visual updating of a representation of an object or its location in a digital reference map of at least one C&C unit (e.g C&C unit 11b) according to data provided via data-link by another C&C unit (e.g by C&C unit 11a)

This is to say that once the system of a "master" C&C unit (i.e. the unit which receives perspective view images of the objects) updates electronically its digital reference map, the digital reference map of the other C&C units which are interconnected by a computer network to the master C&C unit, are updated as well in regard to the situational information of common objects which appear on their digital reference maps.

Figure 2:
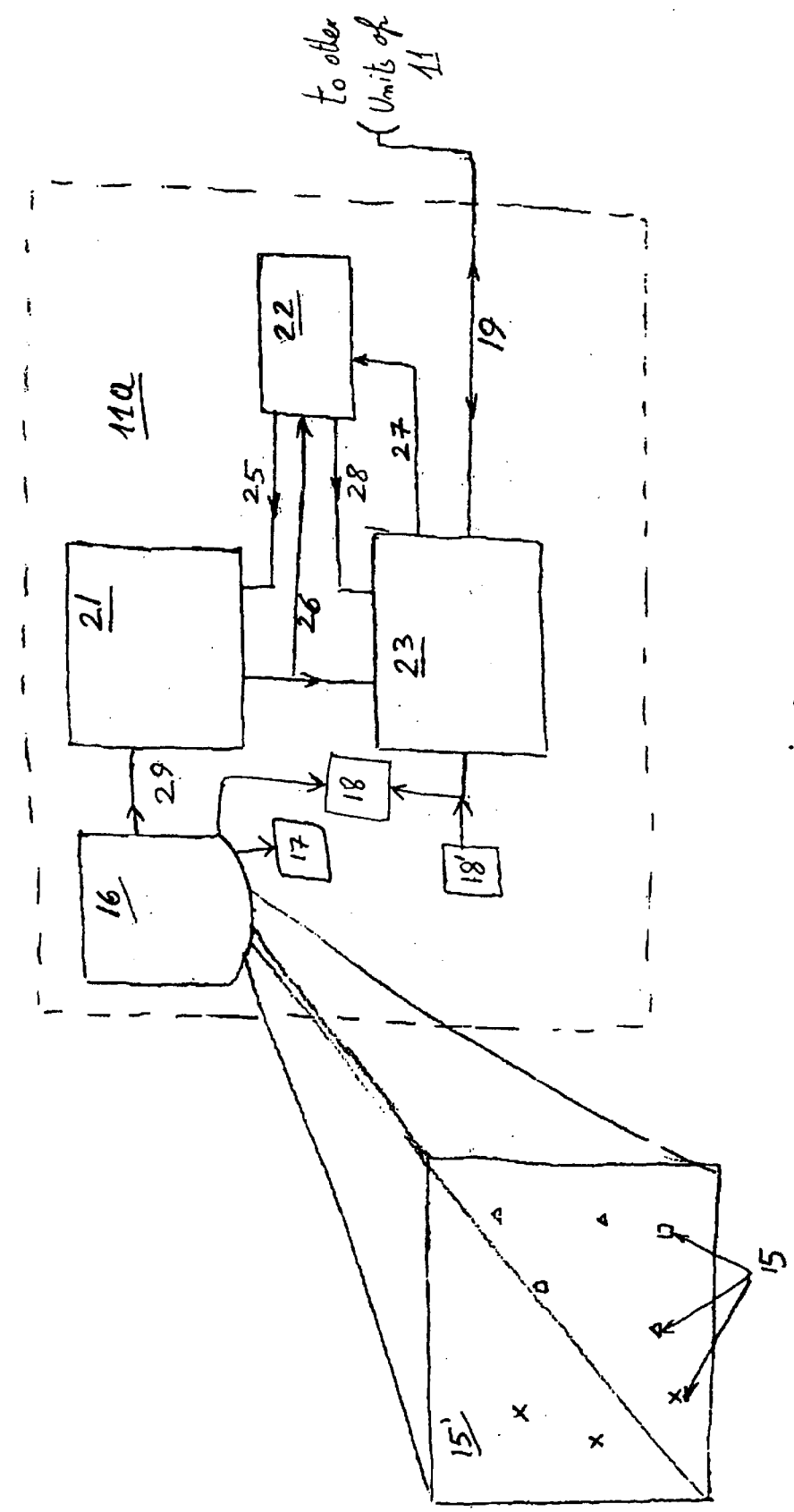

A block diagram, which depicts components and their interrelations in a C&C master unit 11a, is shown in FIG. 2 to which reference is now made.

In FIG. 2; C&C master unit 11a includes a receiving device 16 which receives in real time, images of objects 15, which are located within an imaged scene 15' acquired by an imaging device (not shown) positioned on board of an airborne vehicle (not shown).

Objects 15 which are being watched in imaged scenery 15' are selected by a human operator (not shown) of C&C unit 11a. The operator decides in advance on the location of imaged scene 15' (and accordingly, on the flight destination of the airborne vehicle).

An operation system 23 (a central computer with the appropriate software) reports (arrow 27) to a database 22 information useful to recognize imaged scene 15' (e.g. its geographical boundaries), accordingly database 22 extracts an appropriate stored digital reference map which includes imaged scene 15' (and in which objects 15 may be missing) and sends (arrow 25) an image of the appropriate digital reference map to image registration unit 21 which also accepts (arrow 29) from receiving device 16 in real time digital images of a perspective view of objects 15 in imaged scenery 15'.

Techniques of image registration used by image registration unit 21 are which are known in the art and include a polynomial transform method, a sensor model transform method (see e g. "*Automatic Geo-Spatial Images and Data Exploitation*". Proceedings of SPIE, Vol. 4054Apr. 24, 2000), and in particular a method of features matching transformation, which is mentioned in Israeli Patent No IL 111069 and the references therein.

After image registration, pixel location, which belong to objects 15 on the digital reference map becomes identified and is reported back (arrow 26) to database 22.

Thus, in database 22, a new digital reference map is formed which includes updated two dimensional symbolization of objects 15 (at their appropriate coordinates).

This new digital reference map is delivered (arrow 28) to operating unit 23 which displays it on an appropriate screen 18.

Simultaneously to all this automatic activity, while watching in real time the perspective view of imaged scene 15' which appears on monitor 17 or on screen 18 (together with the digital reference map), the operator of C&C unit 11a perceives constantly the situational information relevant to objects 15, and can whenever he wishes, to mark electronically the location or the image of objects 15 in the digital reference map appearing on screen 18, by using a cursor control device 18'.

The digital grid of the marked objects is stored in database 22 as a second layer on top of the digital reference map. Simultaneously the digital grid regarding marked objects is transferred via a data-link 19 to all other network interconnected units (not shown) of C&C system 11, in which this situational information is incorporated (by units which are analogous to operation system 23), into the digital reference map of imaged area 15' which is stored in the respective databases of these units.

At the same time, the information transferred by data link 19 is visually rendered by the receiving C&C units and displayed on the screens of the respective displays of these units.

The final outcome of the present invention is that operators in all the network interconnected C&C units see on their screens at the same time images of digital reference map which include updated symbolization (e g marking) of the same objects.

While the invention has been described with respect to a limited number of embodiments, it will be appreciated that many variations, modifications and other applications of the invention may be made without departing from the spirit and scope of the invention.

What is claimed is:

1. A method for sharing visual situational information of objects among a plurality of command and control units comprising the steps of:
   (a) providing to each command and control unit a mechanism for storing a digital reference map of a geographical area;
   (b) receiving by at least one command and control unit an image of a scene which includes at least one object within said geographical area;
   (c) registration of said received image of said scene to said digital reference map of said at least one command and control unit;
   (d) updating a situational information of said at least one object in said digital reference map of said at least one command control unit according to said received image of said scene and,
   (e) transferring said updating of said situational information of said at least one object to at least one other command and control unit among said plurality of command and control units.

2. The method as in claim 1 wherein said digital reference map includes a digitized orthogonal photograph of said geographical area.

3. The method as in claim 1 wherein said image of said scene includes a perspective view of said at least one object.

4. The method as in claim 1 wherein said situational information of said at least one object includes information in regard to a damage inflicted to said at least one object.

5. The method as in claim 3 further comprising the steps of:
   (f) acquiring of said image of said scene.

6. The method as in claim 5 wherein said acquiring is effected using an imaging device whose location is selected from the group consisting of onboard of an airborne vehicle, on a topographically elevated surveillance point and upon a top of a mast.

7. The method as in claim 1 wherein said image is selected from the group consisting of optical images in the visible, infrared images, thermal images, laser radar images, radar images, images of an output of a chemical sensor and images of an output of a biological sensor.

8. The method as in claim 1 wherein said registering is effected using at least one technique selected from the group consisting of a polynomial transform method, a sensor model transform method and a features matching transformation method.

9. The method as in claim 1 further comprising the step of:
   (f) displaying visually said digital reference map.

10. The method as in claim 3 further comprising the step of:
    (f) displaying visually said perspective view of said at least one object.

11. The method as in claim 9 wherein said updating of said situational information of said at least one object in said visually displayed digital reference map includes electronically marking of a registered image of said at least one object in said visually displayed digital reference map.

12. The method as in claim 1 wherein said transferring includes transferring over a digital data link.

13. The method as in claim 12 further including the steps of:
    (f) incorporating said data-link transferred situational information of said at least one object in said digital reference map of said at least one other command and control unit, and
    (g) visually rendering by said at least one other command and control unit of said data-link transferred situational information of said at least one object.

14. A system for improving the situational awareness of a plurality of command and control units, the system comprising:
    (a) a plurality of command and control units; in each command and control unit a database located in an addressable memory of said each of command and control units, each said database storing a digital reference map of a geographical area which includes a location of at least one object under a surveillance of at least one command and control unit;
    (b) a mechanism for image registration of a scene in said digital reference map in accordance to a received image of said scene which includes said at least one object, and
    (c) a communication mechanism between said at least one command and control unit and at least one other command and control unit.

15. The system as in claim 14 wherein a command and control unit among said plurality of command and control units is a ground station.

16. The system as in claim 14 wherein a command and control unit among said plurality of command and control units is on board of an aircraft.

17. The system as in claim 14 wherein a command and control unit among said plurality of command and control units is on board a ship.

18. The system as in claim 14 wherein said digital reference map includes a digitized orthogonal photograph of said geographical area.

19. The system as in claim 14 wherein said situational information of said at least one object includes information in regard to a damage inflicted to said at least one object.

20. The system as in claim 14 wherein said communication mechanism includes a digital data link among said command and control units.

21. The system as in claim 14 further comprising:
    (d) an imaging device to form an image of a perspective view of a scene which includes said at least one object;
    (e) an image transmission device communicatively coupled to said imaging device, and
    (f) an image receiving device in said at least one command and control unit communicatively connected to said image transmission device.

22. The method as in claim 21 wherein a location of said imaging device is selected from the group consisting of onboard of an airborne vehicle, on a topographically elevated surveillance point and upon a top of a mast.

23. The system as in claim 21 wherein said imaging device is remotely controlled by said at least one command and control unit.

24. The system as in claim 21 wherein said imaging device is selected from the group consisting of optical imagers in the visible, infrared imagers, thermal imagers, laser radar imagers radar imagers, chemical imagers and biological imagers.

25. The system as in claim 21 further comprising:
    in said at least one command and control unit;

(i) a display for displaying visually said digital reference map stored in said at least one command and control unit;
(ii) a display for displaying visually said image of said scene and,
(iii) a mechanism for marking of a selected object among said at least one object in said digital reference map stored in at least one command and control unit in accordance to said situational information of said selected object.

26. The system as in claim 20 wherein said at least one other command and control unit includes a mechanism for visually rendering of data received via said digital data-link.

27. The system as in claim 26 wherein said at least one other command and control unit includes a mechanism for incorporating said visual rendering in said digital reference map stored in at least one other command and control unit.

* * * * *